US006807593B1

(12) United States Patent
Moss et al.

(10) Patent No.: US 6,807,593 B1
(45) Date of Patent: Oct. 19, 2004

(54) ENHANCED BUS ARCHITECTURE FOR POSTED READ OPERATION BETWEEN MASTERS AND SLAVES

(75) Inventors: Robert W. Moss, Longmont, CO (US); David O. Sluiter, Superior, CO (US); Alan R. Gilchrist, Danville, CA (US); Darren Neuman, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 412 days.

(21) Appl. No.: 10/036,820

(22) Filed: Nov. 1, 2001

(51) Int. Cl.[7] .......................... G06F 13/36; G06F 13/00
(52) U.S. Cl. ...................... 710/110; 710/112; 710/113
(58) Field of Search ................................ 710/107–125, 710/305, 306, 309, 310

(56) References Cited

U.S. PATENT DOCUMENTS

| 5,261,109 A | * | 11/1993 | Cadambi et al. | ............ 710/111 |
| 5,533,204 A | * | 7/1996 | Tipley | ......................... 710/108 |
| 5,568,620 A | * | 10/1996 | Sarangdhar et al. | ........ 710/105 |
| 5,611,058 A | * | 3/1997 | Moore et al. | ................ 710/311 |
| 5,615,343 A | * | 3/1997 | Sarangdhar et al. | ........ 710/112 |
| 5,671,371 A | * | 9/1997 | Kondo et al. | ................ 710/311 |
| 5,835,739 A | * | 11/1998 | Bell et al. | .................... 710/309 |
| 5,870,572 A | * | 2/1999 | Garcia | .......................... 710/310 |
| 6,012,108 A | * | 1/2000 | Kang | ........................... 710/54 |
| 6,012,118 A | * | 1/2000 | Jayakumar et al. | .......... 710/107 |
| 6,078,976 A | * | 6/2000 | Obayashi | ...................... 710/315 |
| 6,457,077 B1 | * | 9/2002 | Kelley et al. | .................. 710/56 |
| 2002/0184428 A1 | * | 12/2002 | Bennett et al. | ............. 710/310 |
| 2003/0046462 A1 | * | 3/2003 | Wolff et al. | ................. 710/100 |
| 2003/0046473 A1 | * | 3/2003 | Dobson et al. | ............. 710/306 |

OTHER PUBLICATIONS

International Business Machines Corporation; The CoreConnectTM Bus Architecture; 1999.
International Business Machines Corporation; [C27E503_PLB_128B–8M] 128–bit PLB Arbiter Core User's Manual Version 4.5 [SA–14–2537–01]; 1996; IBM Microelectronics Division, 1580 Route 52, Bldg 504, Hopewell Junction, NY 12533–6531.

* cited by examiner

Primary Examiner—Sumati Lefkowitz
(74) Attorney, Agent, or Firm—Duft Setter Ollila & Bornsen LLC

(57) ABSTRACT

An electronic bus architecture for supporting posting of read requests by multiple master devices to multiple slave devices. Sideband signals added to the underlying master bus architecture permit slave devices to receive posted read requests from one or more master devices. The sideband signals are used by the slave devices and associated arbitration logic to enable the slave devices with varying latencies to return requested data to the originating masters when the data becomes available. The sideband slave bus architecture may be applied to enhance performance of AMBA based bus architectures as well as other well-known bus architectures supporting one or more master devices.

10 Claims, 3 Drawing Sheets

ENHANCED BUS ARCHITECTURE FOR POSTED READ OPERATION BETWEEN MASTERS AND SLAVES

BACKGROUND OF THE INVENTION

1. Field of the Invention

The invention relates to system bus architectures for electronic systems and in particular relates to an improved architecture for enhancing performance on system buses capable of supporting multiple master devices and multiple slave devices. More specifically, the invention relates to enhancing read performance on the read portion of the system bus by providing slave sideband signals for arbitration of multiple slave devices returning posted read requests from one or more master devices.

2. Discussion of Related Art

Electronic bus structures are generally utilized for interconnection of electronic circuits that exchanging information over the bus. In general, a master device is one that assumes temporary exclusive ownership of signal paths in the bus. Such temporary exclusive ownership permits the master device to communicate with another device on the bus typically referred to as a slave device. Arbitration logic circuits control distribution of temporary exclusive ownership to any of several master devices associate with the bus. Generally, a master device asserts a request signal to request temporary exclusive ownership of the bus. Arbitration logic associated with the bus detects bus request signals from master devices attached to the bus and determines which requesting master device should be granted the requested ownership. The arbitration logic then asserts a grant signal corresponding to the master device that is to receive ownership of the bus. The master device then performs desired transactions to exchange information with a desired slave device and relinquishes the temporary exclusive ownership.

In general, as presently practiced in the art, slave devices do not arbitrate for control of the bus. Rather, master devices assume control of the bus when granted temporary exclusive ownership by the arbitration logic. Slave devices merely respond to signals applied to the bus by a master device that has been granted ownership of the bus. Typically, the master device will issue a read request to a slave device to retrieve required data and write requests to transmit or store data. Write requests are often buffered or registered in the slave device so that the master device will relinquish control of the bus as soon as the required information is transferred to the slave device buffer. By contrast, as presently practiced in the art, read requests are generated by the master device and then await completion by the addressed slave device by return of the requested data.

As presently practiced in the art, some buses supporting multiple master devices and multiple slave devices do not permit posting of a plurality of read requests by one master device to a selected slave device. In particular, AMBA AHB buses do not permit a single master device to post multiple read requests to a single slave device. More specifically, the AMBA Specification Rev2.0 may be found on the World Wide Web at: http://www.armltd.co.uk. Rather, the AMBA AHB bus forces the master device to "stall" awaiting completion of a previous read request to that slave before permitting posting of additional read requests. In general, as presently practiced in the art, once a master device has generated a read transaction on the system bus, all further read transactions by that master device are delayed or stalled awaiting completion of the outstanding read request by that master device. The length of such a delay or stall is a function of the latency of the addressed slave device—the delay required for the slave device to fetch the requested data and prepare it for application to the read portion of the system bus. This present architecture can inhibit optimal performance in a system when slave devices having different latencies.

As is evident from the above discussion, it would be desirable for a bus architecture to permit master devices to post read operations for a slave device for processing in parallel by that slave device. It is clear a need exists to permit improved system bus performance where slave devices exhibit latency.

SUMMARY OF THE INVENTION

The present invention solves the above and other problems, thereby advancing the state of the useful arts, by providing a bus architecture that permits a master device to post read requests to a slave device while enabling coordination of the return of data to the requesting master device. More specifically, the present invention provides for sideband signals enhancing the underlying bus architecture and associated with the slave devices whereby multiple slave devices processing posted read requests from multiple master devices arbitrate for control of the read portion of the system bus to return requested data to the requesting master devices.

In one exemplary preferred embodiment of the present invention, a system bus is provided that utilizes control signals similar to that of the AMBA AHB bus architecture—a high performance bus architecture useful for interconnecting processor, DMA and memory devices. Read requests are posted by master devices to corresponding slave devices. Sideband signals in accordance with the present invention provide for arbitrated control of the read portion of the bus by slave devices when each slave device has data ready for return to a corresponding master device. Other embodiments of the present invention provides for similar sideband signals to enhance other standard bus architectures providing the same benefit to enable multiple master devices to post reads to multiple slave devices.

A first aspect of the present invention provides for an electronic bus comprising: a master bus portion comprising signals used by a plurality of master devices to arbitrate for control of the master bus portion by one master device of the plurality of master devices and further comprising signals used by the plurality of master devices to initiate read and write bus transactions with a plurality of slave devices; a read bus portion comprising signals used by the plurality of master devices and by the plurality of slave devices for return of data requested by read transaction initiated by the plurality of master devices; and a slave bus portion comprising signals used by the plurality of slave devices to arbitrate for control of the read bus portion by one slave device of the plurality of slave devices.

Another aspect of the present invention further provides for a slave request signal path corresponding to each slave device of the plurality of slave devices; and a slave grant signal path corresponding to each slave device, wherein each slave device applies a signal to its corresponding slave request signal path to indicate readiness to return requested data corresponding to a previously posted read transaction, and wherein each slave device awaits receipt of a signal on the slave grant signal path granting the slave device temporary exclusive ownership of the read bus portion to permit application of the requested data to the read bus portion.

DETAILED DESCRIPTION OF THE PREFERRED EMBODIMENTS

Figure 1:
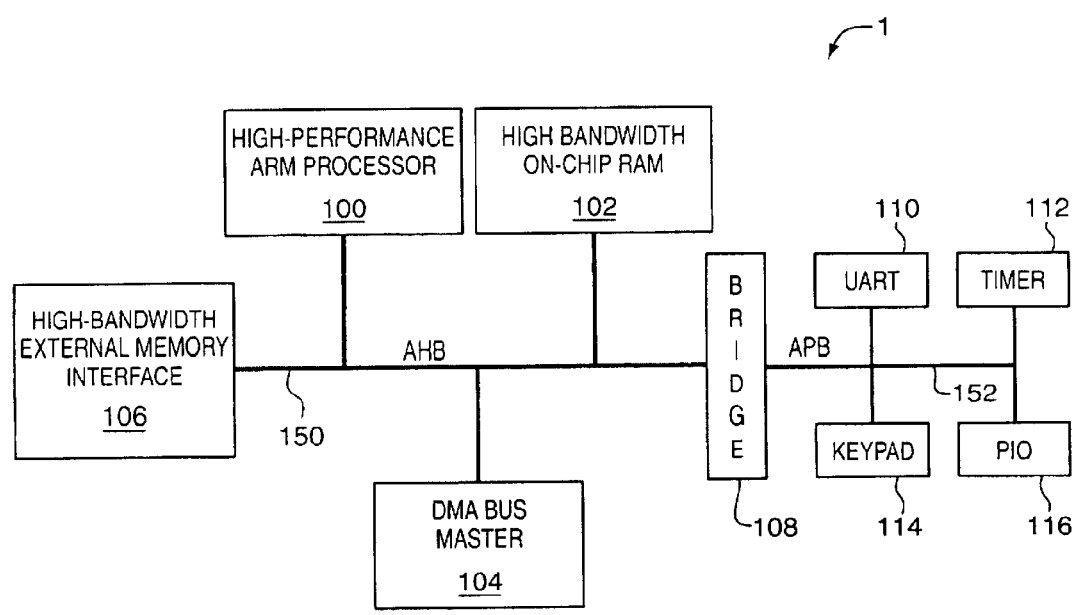
FIG. 1 is a block diagram of a typical AMBA standard bus system with multiple masters connected to multiple slave devices as presently known in the art.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a typical system 1 in which a high-speed bus 150 includes couples a plurality of master devices with a plurality of slave devices. In this typical configuration, a processor 100 and a DMA bus master 104 may each serve as a master device on high-speed bus 150. A plurality of devices in FIG. 1 typify slave devices coupled to high-speed bus 150. In particular, high bandwidth external memory interface 106, high bandwidth on chip memory interface 102, and a bus bridge device 108 that serves to couple high-speed bus 150 to a lower speed bus 152 for communication with peripheral I/O devices 110 through 116 all may serve at various times as slave devices coupled to high-speed bus 150.

Specifically, system 1 is an AMBA bus structure coupled with an ARM compliant processor device. In particular in an AMBA system, high-speed bus 150 may be either an AHB bus, a Multi-layer AHB bus or an AHB-Lite bus. The bus bridge slave device 108 preferably couples the high-speed bus 150 to a lower speed AHB or APB bus 152 for communicating with lower speed I/O peripheral devices.

As noted above, such bus structures as presently known in the art have a weakness in their design in that a bus master device is precluded from generating read operations on the high-speed bus 150 targeting the same or other slave devices while the same master device has an outstanding read operation yet to be completed. In general, present AHB bus structures permit arbitration for multiple master's to assume control of the bus but provide no mechanism for multiple slave devices to notify corresponding master devices of the availability of data from a previously posted read request.

The present invention provides a bus architecture that supports multiple master and slave devices and specifically provides signal paths to permit to each of several slave devices to notify a corresponding master device of the availability of read data corresponding to a previously posted read request. Specifically, the present invention provides an enhanced bus structure preferably based upon the AMBA AHB bus standard modified with the addition of "sideband" slave signaling features. These features are particularly useful for maintaining high system throughput from master devices accessing high-speed, high latency slave memory devices on a common bus.

Figure 2:
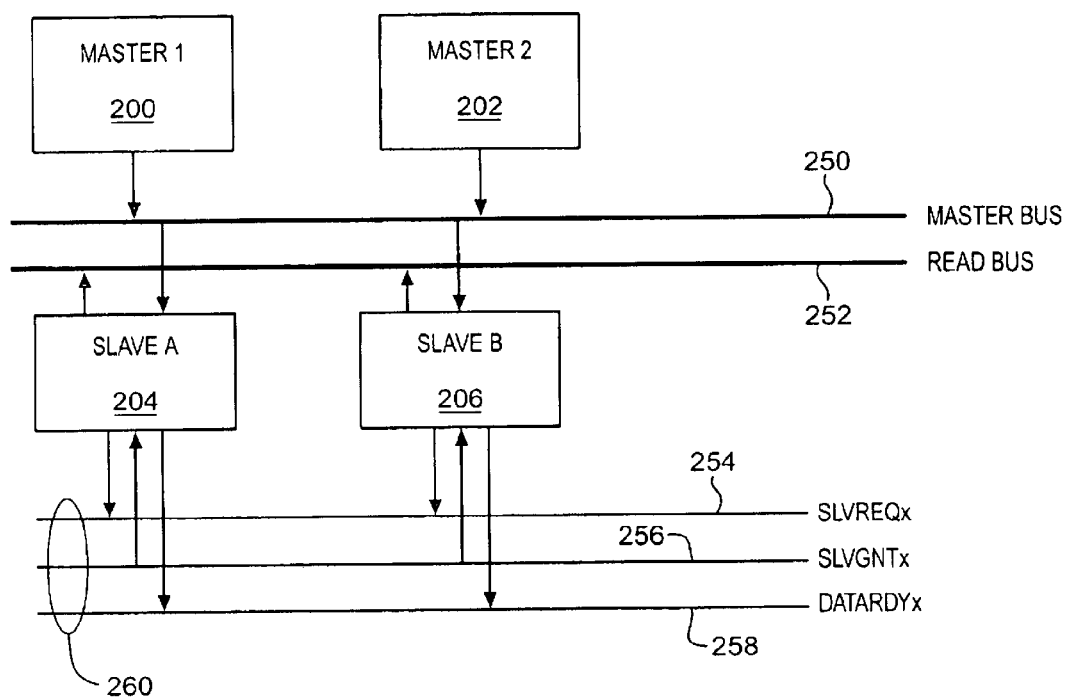
FIG. 2 is a block diagram depicting the enhancement of a typical bus architecture to add slave device sideband signals in accordance with the present invention.

FIG. 2 is a block diagram depicting features of an enhanced bus architecture in accordance with the present invention wherein multiple master devices (200 and 202) exchange information with multiple slave devices (204 and 206). The master devices 200 and 202 participate in arbitration for control of portions of the system bus referred to in FIG. 2 as "master bus" (bus 250). Master bus 250 includes all the signals normally required for arbitration among the plurality of master devices and signal paths normally required for addressing logic to identify particular slave devices by an address within the system and for write operations over the bus. A subset of the system bus is identified in FIG. 2 as "read bus" (bus 252). Read bus 252 includes portions of the system bus required for return of data from addressed slave devices in response to read requests from master devices. In typical embodiments, a system bus would be implemented including all the features of master bus 250 and read bus 252. The distinction between master bus 250 and read bus 252 is a logical one only for purposes of describing the features and operations of the enhancements of the present invention.

Key to the present invention are sideband slave device bus signals collectively shown in FIG. 2 as slave bus 260. Slave bus 260 includes signals used exclusively by slave devices 204 and 206 to arbitrate among slave devices having data ready for return to corresponding master devices in response to previously posted read request. In prior known bus architectures while a read request is pending for a first slave device generated by a first master, other read requests generated for other slave devices by other masters would be stalled or delayed. The sideband signals in the slave bus 260 of the present invention permit multiple slave devices to arbitrate among themselves for appropriate control of the read bus 252 portion of the system bus and return requested data in proper order to requesting master devices. In accordance with this architecture, multiple read requests may be posted by a master device to a single slave device within the system thereby permitting improved overall system performance. In particular, the enhancements of the present invention provides for improved system performance where multiple master devices communicate via a high-speed bus with high-speed memory slave devices. More specifically, in an exemplary preferred embodiment, this architecture may benefit, for example, AHB bus DMA master devices accessing multiple memory locations in scatter/gather list processing or, for example, may enhance performance of system cache memory fill operations. In both cases, an AHB master device may post multiple read operations to a slave memory device so that latency processing within the memory device may overlap other operations in the memory device.

Slave bus 260 is comprised of a number of signals utilized to provide for arbitration among the plurality of slave devices to apply their return data to the read bus 252 of the system. Preferably, slave bus 260 includes a plurality of slave request signal paths 254 (SLVREQx), a corresponding plurality of slave grant signal paths 256 (SLVGNTx) and a plurality of data ready signal paths 258 (DATARDYx). The specific number of SLVREQx and SLVGNTx signals is a well-known matter of design choice corresponding to the number of supported slave devices in a particular application. For example, if the system designer chooses to implement the present invention for a maximum of eight slave devices, there will be eight parallel slave request signal paths (i.e., SLVREQA..SLVREQH) and eight parallel slave grant signal paths (SLVGNTA..SLVGNTH). In like manner, the number of DATARDYx signals corresponds to the number of master devices supported in the system. Such design choices are well-known to those of ordinary skill in the art.

Figure 3:
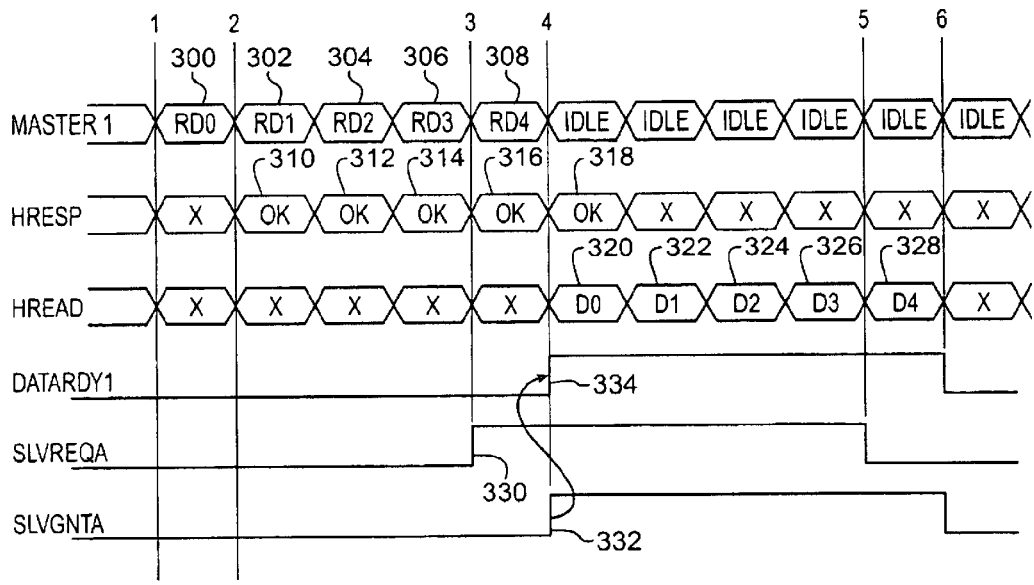
FIG. 3 is a timing diagram showing operation of the slave device sideband signal enhancements of the present invention as applied to a read transaction between a single master device and a single slave device.
Figure 4:
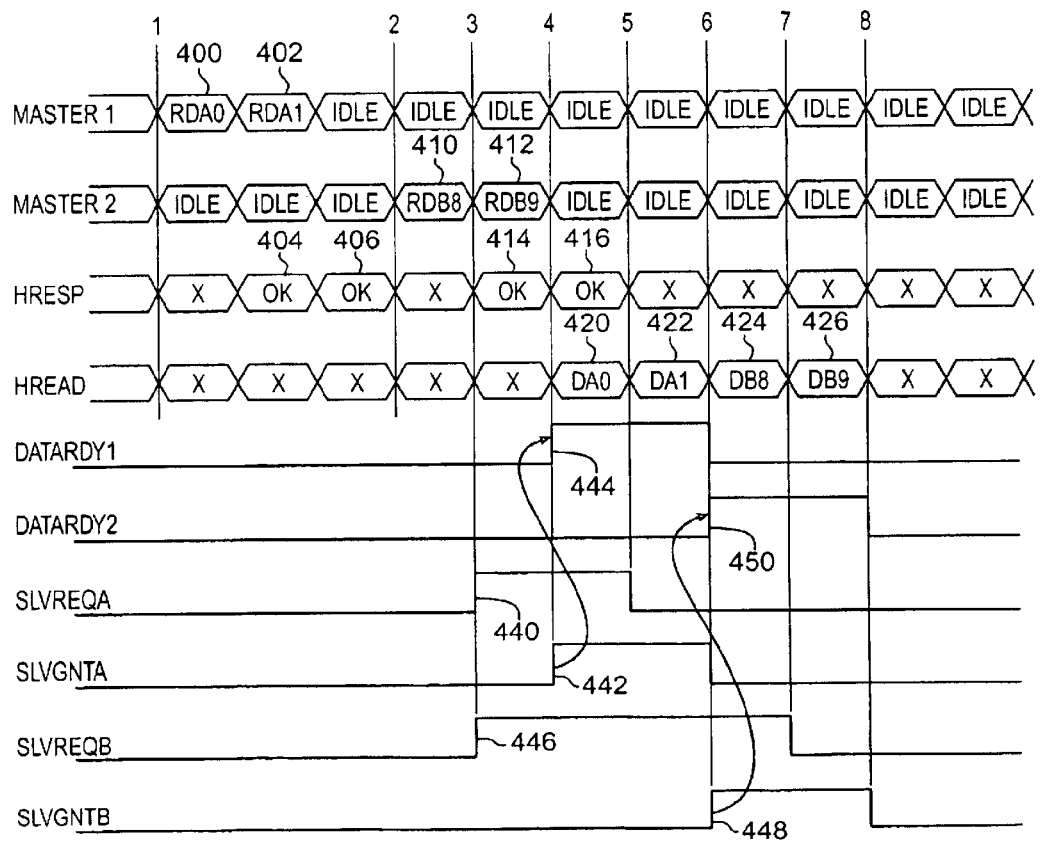
FIG. 4 is a timing diagram showing operation of the slave device sideband signal enhancements of the present invention as applied to a read transaction between multiple master devices and corresponding multiple slave devices.

FIGS. 3 and 4 are signal timing diagrams describing operation of the sideband signals on slave bus 260 of the present invention. FIG. 3 depicts typical timing for returning data to a requesting master device from a single selected slave device. In particular, starting at time indicator 1, references 300 through 308 represent five consecutive read requests issued by master device "Master 1" (RD0 through RD4). Arbitration logic associated with master bus 250 of FIG. 2 arbitrates among master devices to grant temporary exclusive control of the master bus to a requesting master device. Starting at time indicator 1 it is presumed that "Master 1" has won the arbitration transactions preceding this the starting time of this diagram. In accordance with standard AMBA AHB bus operations the addressed slave device responds with an "OK" acknowledgment to each read request. Starting at time indicator 2 are five "OK" acknowledgments 310 through 318 corresponding to the issued read requests. In accordance with the present invention, the "OK" acknowledgment merely indicates that the slave has accepted the read request and posted it in an appropriate queue associated with the slave device. If the slave device is presently incapable of accepting further posted read transactions, other appropriate responses may be generated to stall the bus with regard to further read transactions. Such operations to initiate, and acknowledge receipt of, a read transaction between master and slave devices are well-known to those of ordinary skill in the art and need not be discussed further here. Key to the present invention is the fact that the requested data is not yet ready for return by the slave device but further read transactions may be posted by the same master (or by other master devices to other slave devices as discussed herein below).

At some later point in time depending on the latency of the slave device, the slave device will be prepared to return the requested data in response to the earlier posted read requests. At time indicator 3, the slave asserts the slave request signal (SLVREQA) corresponding to the previously identified slave device (slave device #A) to which the posted read request was directed. The slave request signal assertion requests ownership of the read bus portion of the system bus by the requesting slave device (reference 320). Well known arbitration techniques will eventually permit the requesting slave device to receive temporary exclusive ownership of the read bus portion of the system bus. At such time, the arbiter circuit (not shown) will assert the slave grant signal (SLVGNTA) corresponding to the slave device requesting temporary ownership of the read bus portion of the system bus (reference 332). Upon assertion of the slave grant signal, the slave device is free to apply the return data to the read portion of the system bus for all data retrieved for corresponding posted read requests (references 320 through 328). To indicate to the master device that the requested data is now available, the slave device also asserts the data ready strobe signal (DATARDY1) corresponding to the master device ("Master 1") that posted the read request. The master device registers the valid data from the read bus portion of the system bus for each clock cycle during which data ready signal remains asserted.

In the preferred embodiment, the slave device deasserts the slave request signal prior to application of the final data value corresponding to the last outstanding posted read request as indicated at time indicator 5. Lastly, the slave device deasserts data ready strobe signal prior to the next clock after the last data value has been registered by the master device from the read bus portion of the system bus and the arbiter circuits deassert the slave grant signal as indicated at time indicator 6.

Those of ordinary skill in the art will recognize a wide variety of specific timing details in accordance with well-known bus design choices. In the preferred embodiment, slave grant signals should be asserted by the slave arbitration logic (not shown) no sooner than the next clock cycle following assertion of the slave request signal by the slave device. Preferably, the data ready signal and the slave grant signal are generated in rapid succession by combinatorial logic.

FIG. 4 is a timing diagram depicting a more complex sequence of transactions in accordance with the present invention wherein multiple master devices (Master 1 and Master 2) each post multiple read requests to each of two slave devices (Slave A and Slave B). At time indicator 1 on FIG. 4, Master 1 posts two read requests for Slave A (RDA0 at reference 400 and RDA1 at reference 402). As above, Slave A responds to each read request with an "OK" as indicated by references 404 and 406. At time indicator 2, Master 2 posts two read requests for Slave B (RDB8 reference 410 and RDB9 reference 412). As above, Slave B responds on the master bus portion of the system bus with an "OK" response (reference 414 and 416) indicating acceptance of the read requests.

At time indicator 3, Slaves A and B (slave devices of different latencies) both are prepared to return the read data requested by corresponding Masters 1 and 2, respectively. At time indicator 3, Slave A asserts its slave request (SLVREQA) and Slave B asserts its slave request (SLVREQB—references 440 and 446). The arbiter logic for slave devices (not shown) applies any of several well-known techniques to select one of the requesting slave devices. The arbiter logic asserts slave grant A (SLVGNTA) at time indicator 4 (reference 442) and data ready for Master 1 (DATARDY1) is asserted at reference 444. Slave A then applies the return data signals to the read bus portion of the system bus as indicated by references 420 and 422. (DA0 and DA1 respectively). At time indicator 5, Slave A deasserts slave request A (SLVREQA). At time indicator 6 the last data word generated by Slave A has been registered by Master 1, slave grant A and data ready 1 (SLVGNTA and DATARDY1) are deasserted, and the arbiter circuit asserts slave grant B (SLVGNTB) in response to the continued assertion of slave request B (SLVREQB) by Slave B (reference 448). Substantially simultaneously, data ready 2 (DATARDY2) is asserted and the Slave B applies return data for Master 2 (DB8 reference 430 and DB9 reference 432). At time indicator 7, Slave B deasserts slave request B (SLVREQB) after applying the last of the two return data values to the read portion of the bus. At time indicator 8, after Master 2 has registered both return data values from Slave B, slave grant B and data ready 2 (SLVGNTB and DATARDY2) are deasserted and the buses return to an idle state.

As above, those of ordinary skill the art will recognize a variety of specific timing details in accordance with well-known design choices. In the preferred embodiment, posted read requests by master devices must be returned to the requesting master in the same order they were issued. Preferably, this means that any single master device cannot issue posted read requests to multiple slave devices concurrently because the master device cannot guarantee the order of data returned from such multiple slave devices.

Though described principally in the context of a system bus similar to the AMBA AHB bus architecture, the enhanced sideband slave signaling features of the present invention may be beneficially applied to any well-known bus architectures where multiple masters communicate with multiple slaves. Further, the slave arbitration logic associated with the features of the present invention to arbitrate between a plurality of slave devices requesting temporary exclusive control of the slave bus and the read bus of the system may utilize any of several well-known arbitration techniques to select an appropriate slave device. All such design choices are well known to those of ordinary skill in the art.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. An electronic bus comprising:

a master bus portion comprising signals used by a plurality of master devices to arbitrate for control of said master bus portion by one master device of said plurality of master devices and further comprising signals used by said plurality of master devices to initiate read and write bus transactions with a plurality of slave devices;

a read bus portion comprising signals used by said plurality of master devices and by said plurality of slave devices for return of data requested by read transaction initiated by said plurality of master devices; and a slave bus portion comprising signals used only by said plurality of slave devices to arbitrate for control of said read bus portion by one slave device of said plurality of slave devices.

2. The bus of claim 1 further comprising:

a queue within each slave device of said plurality of slave devices used by said each slave device to queue posted read transactions from a master device of said plurality of master devices.

3. The bus of claim 1 wherein said slave bus portion includes:

a slave request signal path corresponding to each slave device of said plurality of slave devices; and a slave grant signal path corresponding to said each slave device, wherein said each slave device applies a signal to its corresponding slave request signal path to indicate readiness to return requested data corresponding to a previously posted read transaction, and wherein said each slave device awaits receipt of a signal on said slave grant signal path granting said each slave device temporary exclusive ownership of said read bus portion to permit application of said requested data to said read bus portion.

4. The bus of claim 3 wherein said slave bus portion further includes:

a data ready signal path on which a data ready signal is applied by said each slave device to indicate to said master device the availability of valid data on said read bus portion.

5. A system comprising:

a master device;

a slave device; and a system bus coupled to said master device and coupled to said slave device for exchange of electronic signals there between wherein said system bus includes:

a master bus portion comprising signals used by said master device to arbitrate for control of said master bus portion and further comprising signals used by said master device to initiate read and write bus transactions with said slave device;

a read bus portion comprising signals used by said master device and by said slave device for return of data requested by read transaction initiated by said master device; and a slave bus portion comprising signals used only by said slave device to arbitrate for control of said read bus portion by said slave device.

6. The bus of claim 5 wherein said slave bus portion includes:

a slave request signal path corresponding to said slave device; and a slave grant signal path corresponding to said slave device, wherein said slave device applies a signal to its corresponding slave request signal path to indicate readiness to return requested data corresponding to a previously posted read transaction, and wherein said slave device awaits receipt of a signal on said slave grant signal path granting said slave device temporary exclusive ownership of said read bus portion to permit application of said requested data to said read bus portion.

7. The bus of claim 6 wherein said slave bus portion further includes:

a data ready signal path on which a data ready signal is applied by said slave device to indicate to said master device the availability of valid data on said read bus portion.

8. A system comprising:

a master bus;

a master device coupled to said master bus;

a slave bus; and a slave device coupled to said master bus and coupled to said slave bus, wherein said master device initiates read operations directed to said slave device over said master bus, wherein multiple said read operations are posted to said slave device by said master device, wherein only said slave device arbitrates over said slave bus with other slave devices coupled to said slave bus for temporary exclusive access to a read portion of said master bus, and wherein said slave device returns requested data for each of said multiple of said read operations to said master device over said read portion in response to winning the arbitration over said slave bus for temporary exclusive control of said read portion.

9. The system of claim 8 wherein said slave bus includes:

a slave request signal path corresponding to said slave device; and a slave grant signal path corresponding to said slave device, wherein said slave device applies a signal to its corresponding slave request signal path to indicate readiness to return requested data corresponding to a previously posted read operation, and wherein said slave device awaits receipt of a signal on said slave grant signal path granting said slave device temporary exclusive ownership of said read portion to permit application of said requested data to said read portion.

10. The system of claim 9 wherein said slave bus further includes:

a data ready signal path on which a data ready signal is applied by said slave device to indicate to said master device the availability of valid data on said read portion.

* * * * *